United States Patent
Goto

(10) Patent No.: US 9,116,260 B2
(45) Date of Patent: Aug. 25, 2015

(54) OPTICAL DEVICE HAVING AN ALIGNMENT MECHANISM

(75) Inventor: Hiroshi Goto, Ushiku (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/879,244

(22) PCT Filed: Apr. 10, 2012

(86) PCT No.: PCT/US2012/032825
§ 371 (c)(1),
(2), (4) Date: Apr. 12, 2013

(87) PCT Pub. No.: WO2013/154531
PCT Pub. Date: Oct. 17, 2013

(65) Prior Publication Data
US 2013/0265661 A1    Oct. 10, 2013

(51) Int. Cl.
*G02B 7/02* (2006.01)
*G02B 7/00* (2006.01)
*B29D 11/00* (2006.01)
*G02B 27/62* (2006.01)

(52) U.S. Cl.
CPC .............. *G02B 7/00* (2013.01); *B29D 11/0074* (2013.01); *G02B 7/025* (2013.01); *G02B 27/62* (2013.01)

(58) Field of Classification Search
CPC .. G02B 26/001; G02B 26/02; G02B 26/0833; G02B 26/0841; G09G 3/346; B60R 1/088; B81B 7/0067; Y10S 359/904
USPC .................................................. 359/290–297
See application file for complete search history.

(56) References Cited

U.S. PATENT DOCUMENTS

| | | | |
|---|---|---|---|
| 7,680,376 B2 | 3/2010 | Goebel et al. | |
| 2006/0204177 A1 | 9/2006 | Singh et al. | |
| 2009/0059344 A1* | 3/2009 | Marxer et al. | 359/290 |

FOREIGN PATENT DOCUMENTS

| | | |
|---|---|---|
| JP | 2002290842 A | 10/2002 |
| JP | 2004258300 A | 9/2004 |
| JP | 2011075969 A | 4/2011 |

OTHER PUBLICATIONS

Notification of Transmittal of the International Search Report and the Written Opinion of the International Searching Authority, PCT/US2012/032825, May 30, 2012.

(Continued)

*Primary Examiner* — Mahidere Sahle
(74) *Attorney, Agent, or Firm* — Ren-Sheng International

(57) ABSTRACT

Techniques described herein generally relate to optical devices and methods of manufacturing optical devices. An example optical device includes a first substrate having a first optical element, a second substrate coupled to the first substrate, and cured resin. The first substrate has a first optical element. The second substrate has at least one supporting structure and a second optical element supported by the at least one supporting structure. The at least one supporting structure has at least one receptor. The cured resin is arranged in the at least one receptor of the at least one supporting structure effective to position the second optical element relative to the first optical element.

23 Claims, 12 Drawing Sheets

(56) References Cited

OTHER PUBLICATIONS

Brian E. Yoxall et al., "Two-Axis MEMS Lens Alignment System for Free-Space Optical Interconnect", IEEE Journal of Selected Topics in Quantum Electronics, May/Jun. 2011, pp. 559-565, vol. 17, No. 3.

Jeffery C. C. Lo et al., "Chip-on-Chip 3D Optical Interconnect with Passive Alignment", IEEE Electronic Components and Technology Conference, 2004, pp. 2015-2019.

* cited by examiner

OPTICAL DEVICE HAVING AN ALIGNMENT MECHANISM

CROSS-REFERENCE TO RELATED APPLICATIONS

The present application is a U.S. national stage filing under 35 U.S.C. §371 application of International Application PCT/US2012/032825, filed on Apr. 10, 2012 and entitled "OPTICAL DEVICE HAVING AN ALIGNMENT MECHANISM." The International Application, including any appendices or attachments thereof, is incorporated by reference herein in its entirety.

TECHNICAL FIELD

The present disclosure relates generally to optical devices, and more particularly to an optical device with a first optical device and a second optical device aligned with the first optical device.

BACKGROUND

Unless otherwise indicated herein, the materials described in this section are not prior art to the claims in this application and are not admitted to be prior art by inclusion in this section.

An optical device can be made up of a plurality of optical elements. For example, an optical device may be formed by combining a variety of optical elements including a light-emitting element such as a laser diode (LD) or a light-emitting diode (LED), a passive element such as a lens, a waveguide or a switch, and a light-receiving element such as a photo diode or a charge coupled device (CCD). Generally, such an optical device can be fabricated by mounting each optical element on a substrate. A mounting robot may be used for adjusting the optical axis of each optical element.

Recently, instead of mounting optical elements on a substrate individually, there is an interest in wafer-based mounting technology in order to improve efficiency of production. In the fields of semiconductor devices and micro electro mechanical systems (MEMS), a wafer-level packaging (WLP) technology has been developed. However, such technology cannot be simply applied to fabricate an optical device including optical elements. This is because it is difficult to satisfy optical axis adjustment precision at the sub-micron level in order to ensure the required optical properties over an entire wafer by the WLP technology. This is particularly difficult when an optical device is formed using more than one type of substrate, for example using a silicon substrate and a glass substrate.

The present disclosure contemplates that in order to establish wafer-level optical device mounting technology, it may be desirable to develop a mounting method with which the optical alignment precision can be easily ensured over the entire wafer.

SUMMARY

The present disclosure generally relates optical devices. In some examples, an optical device may include a first substrate, a second substrate and a cured resin. The first substrate may have a first optical element. The second substrate may have at least one supporting structure and a second optical element supported by the at least one supporting structure. The at least one supporting structure may have at least one receptor. The second substrate may be coupled to the first substrate.

Additional examples of the present disclosure may relate to an optical device that includes a substrate, at least one optical element arranged on the substrate, and at least one supporting structure formed on the substrate and supporting the at least one optical element. The at least one supporting structure may have at least one receptor configured to accept curable resin effective to position the at least one optical element by curing the curable resin.

Yet further examples of the present disclosure may relate to a method for fabricating an optical device. According to some example methods, a first substrate having at least one first optical element may be prepared. At least one second optical element on a second substrate may be arranged. At least one supporting structure having at least one receptor on the first substrate may be formed such that the at least one supporting structure supports the at least one second optical element. The first substrate may be aligned with the second substrate. A positional relationship between the at least one first optical element and the at least one second optical element may be determined. Curable resin may be injected into the at least one receptor based on the determined positional relationship. The curable resin may be cured effective to align the at least one first optical element with the at least one second optical element.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
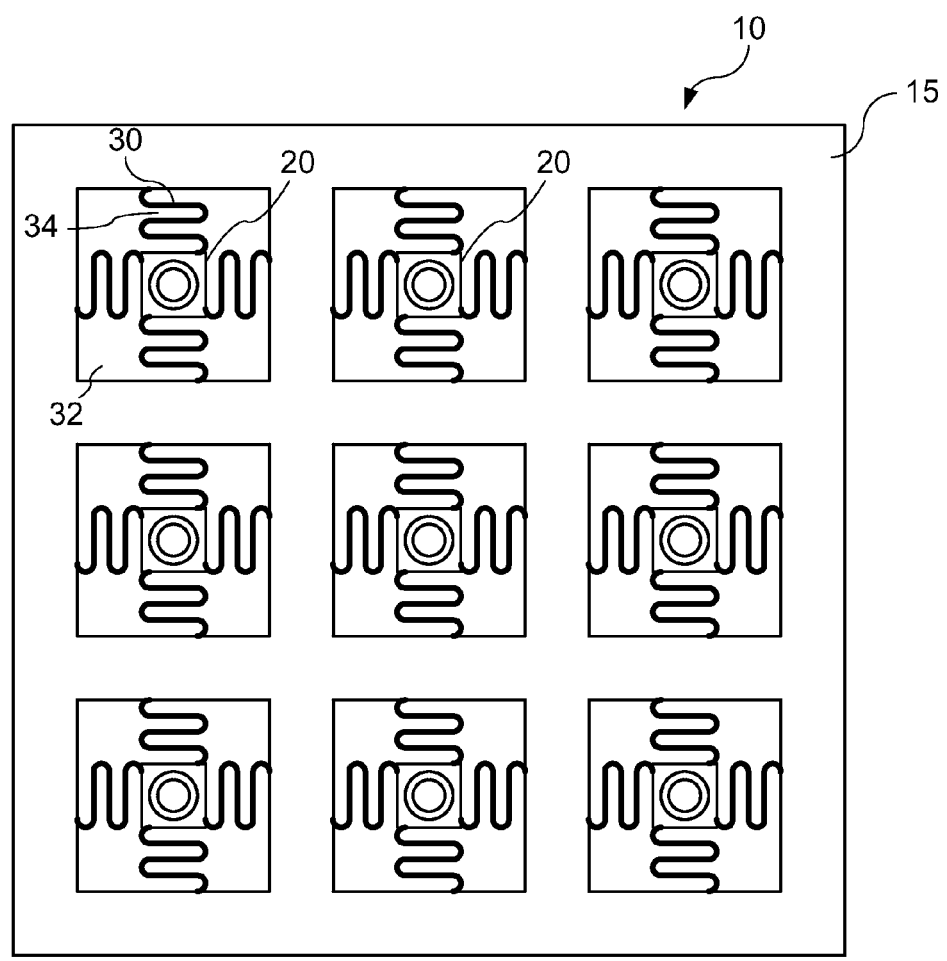
FIG. 1 is a schematic view showing an example of an optical device substrate arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated and designed in a wide variety of different configurations, all of which are explicitly contemplated herein.

This disclosure is generally drawn, inter alia, to methods, apparatus, and systems related to optical devices and manufacturing of optical devices.

Briefly stated, an example optical device may include a first substrate having a first optical element, a second substrate coupled to the first substrate, and cured resin. The first substrate has a first optical element. The second substrate has at least one supporting structure and a second optical element supported by the at least one supporting structure. The at least one supporting structure has at least one receptor. The cured resin is arranged in the at least one receptor of the at least one supporting structure effective to position the second optical element relative to the first optical element.

FIG. 1 is a schematic view showing an example of an optical device substrate arranged in accordance with the present disclosure. As shown in FIG. 1, the optical device substrate 10 may be formed with a substrate 15. The substrate 15 may, for example, be composed of transparent material such as silica glass, plastic, compound semiconductor or transparent resin. A non-limiting example of the size (e.g., length or width) of the substrate 15 may be greater than several inches and less than tens of inches. Specific examples of the size may include about 6 inches, about 8 inches, about 12 inches, and ranges between any two of these values. Alternatively, the size of the substrate 15 may be more than about tens of inches. Optical elements 20 and supporting structures 30 may be formed on the substrate 15. Although FIG. 1 shows nine optical elements 20 arranged in a square array (e.g., 3×3 array) as an example, the optical device substrate 10 may include more optical elements 20 or less optical elements 20, and may be arranged in any other array such as a single row (1-D array), or a two dimensional array that may be non-square.

The optical element 20 may be, for example, a lens or a light-receiving element. The supporting structure 30 may be, for example, a spring structure formed in a meander shape, which may be configured to support the optical element 20 on the substrate 15. The supporting structure 30 may be formed, for example, by removing a part 32 of the substrate 15 by dry etching. Each supporting structure 30 may include receptors 34, where each receptor 34 may be configured to accept resin. A non-limiting example of the size of the receptor 34 may be greater than a few microns and less than tens of microns. Alternatively, the size of the receptor 34 may be more than tens of microns.

The optical elements 20 and the supporting structures 30 may be formed, for example, by processing the substrate 15 using a micro-machining method or other methods that may be used in MEMS technology. For example, if the substrate 15 is composed of silica glass, the optical elements 20 and the supporting structures 30 may be formed on the substrate 15 by using dry etching process technology.

Figure 2:
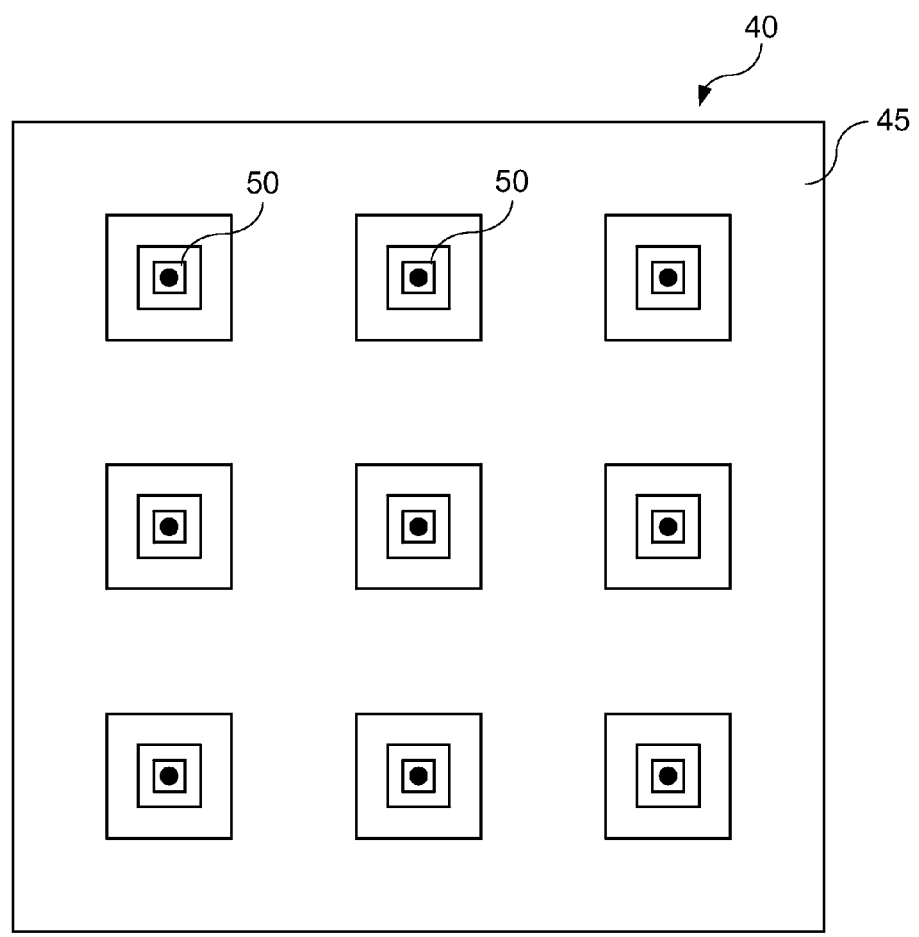
FIG. 2 is a schematic view showing an example of an optical device substrate arranged in accordance with the present disclosure.

FIG. 2 is a schematic view showing an example of an optical device substrate arranged in accordance with the present disclosure. In this example as shown in FIG. 2, the optical device substrate 40 may be formed with a substrate 45. The substrate 45 may, for example, be composed of silicon. Optical elements 50 may be formed on the substrate 45. The optical element 50 may be, for example, a light-emitting element such as an LD or an LED. Although FIG. 2 shows nine optical elements 50 arranged in an array, as an example, the optical device substrate 40 may include more optical elements 50 or less optical elements 50, which may be arranged in any desired configuration of 1-D or 2-D array.

Figure 3:
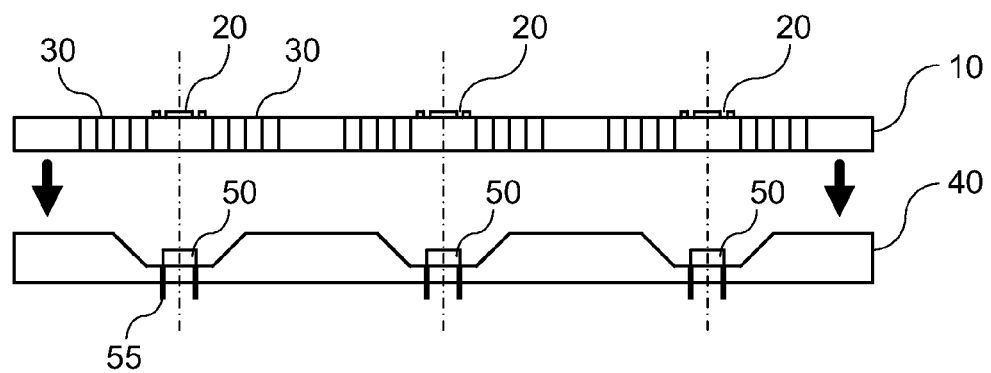
FIG. 3 is a cross-sectional view showing an example of optical device substrates arranged in accordance with the present disclosure.
Figure 4:
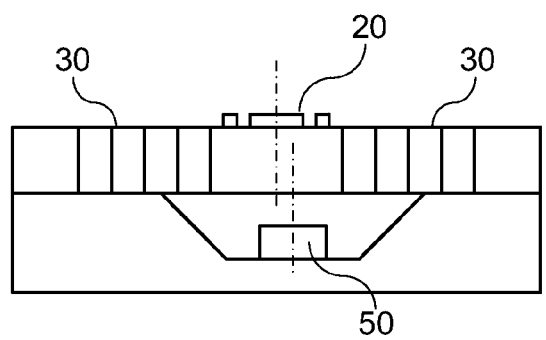
FIG. 4 is a cross-sectional view showing an enlarged example of optical device substrates arranged in accordance with the present disclosure.

FIG. 3 is a cross-sectional view showing an example of optical device substrates, while FIG. 4 is a cross-sectional view showing an enlarged example of optical device substrates, both arranged in accordance with the present disclosure. The optical devices may be formed using optical device substrates 10 and 40 in FIGS. 1 and 2.

As shown in FIG. 3, a plurality of pairs of the optical elements 20 and 50 may be formed by overlaying the optical device substrate 10 on the optical device substrate 40. As shown in FIG. 3, each optical element 50 may have a terminal 55 configured to receive power and/or control signals to drive the optical element 50. The position or shape of the terminal 55 may be arbitrarily selected.

The optical device substrates 10 and 40 may be joined by a bonding method with the supporting structures 30 being movable. For example, when the optical device substrate 10 is a glass substrate and the optical device substrate 40 is a silicon substrate, anodic bonding may be used for joining the substrates 10 and 40. Alternatively, any other bonding method such as adhesive bonding may be used for joining the substrates 10 and 40. For example, epoxy, polyimide or light curing resin may be used as adhesive material for adhesive bonding.

The optical elements 20 and 50 may be formed so that each optical element 20 can be aligned with a corresponding optical element 50 when the optical device substrate 10 is overlaid with the optical device substrate 40. However, as shown in FIG. 4, there may be a small misalignment between the optical axis of the optical element 20 and that of the optical element 50 in practice. The misalignment may be caused by, for example, variation in the mounting positions of the optical elements 50 mounted on the substrate 45 individually. In addition, if the substrate 15 on which the optical element 20 is formed may be composed of different material from the substrate 45, there may be a difference between the substrates 15 and 45 in thermal expansion. Accordingly, such misalignment of the optical axes for each pair of the optical elements 20 and 50 may be adjusted as will be discussed below.

Figure 5:
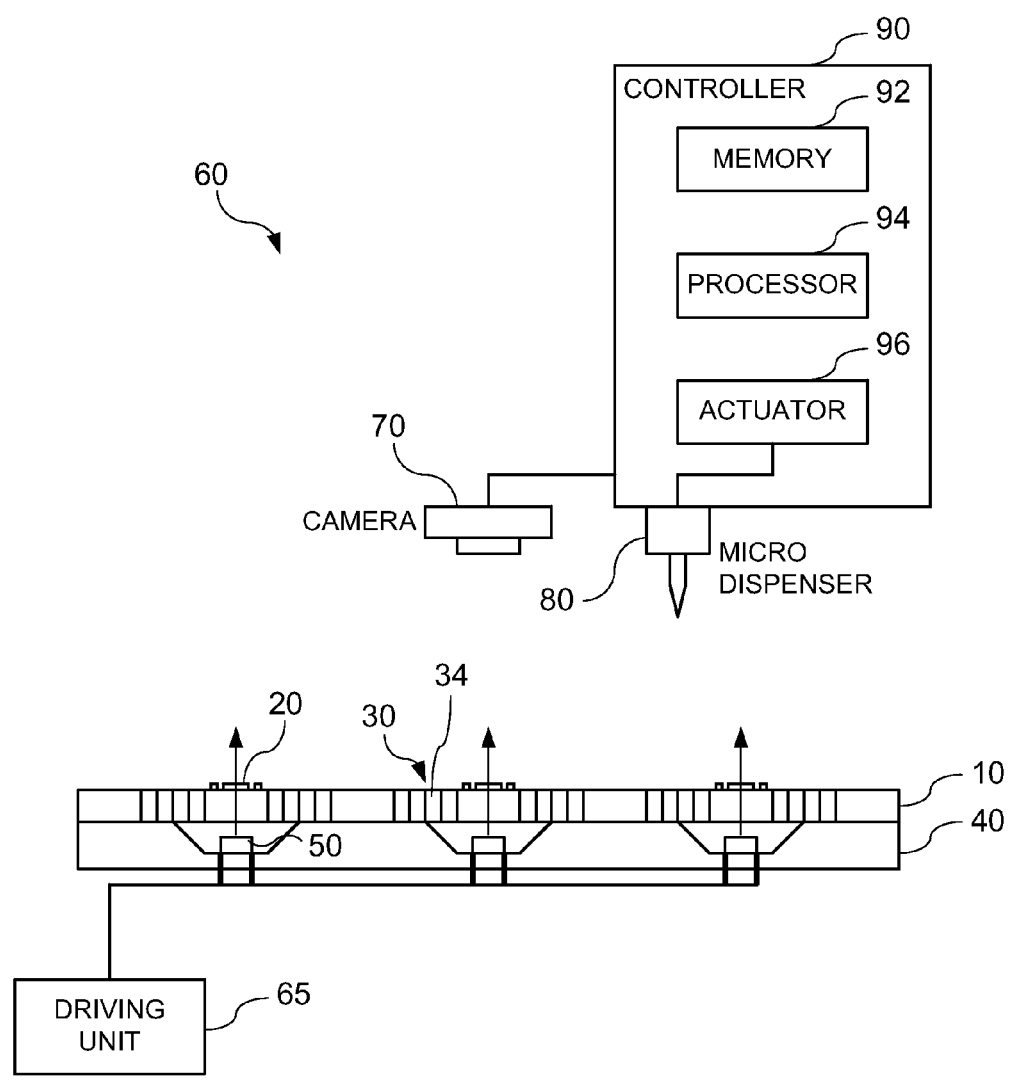
FIG. 5 is a schematic block diagram showing an example of an adjusting apparatus arranged in accordance with the present disclosure.

FIG. 5 is a schematic block diagram showing an example of an adjusting apparatus arranged in accordance with the present disclosure. As shown in FIG. 5, the adjusting apparatus 60 may include one or more of a driving unit 65, a camera 70, a micro dispenser 80 and/or a controller 90. The adjusting apparatus 60 may be configured to adjust the positions of the optical elements 20.

The driving unit 65 may be configured to drive the optical elements 50 by providing power and control signals to the optical elements 50. For example, if the optical element 50 is an LD, the driving unit 65 may be configured to drive the optical element 50 with an appropriate electrical signal so that the optical element 50 can emit a laser beam from the LD.

The camera 70 may be used to examine the misalignment between optical axes of each pair of the optical elements 20 and 50. For example, if the optical element 50 is an LD and the optical element 20 is a lens, the camera 70 may be configured to capture one or more images formed by laser beams emitted from the optical element 50 through the optical elements 20. The image(s) captured by the camera 70 may be output to the controller 90, which can then evaluate the captured image(s) and identify any misalignment between the optical axes of the optical elements 20 and 50.

The micro dispenser 80 may be configured to be positioned at any location on the optical device substrate 10 under the control of the controller 90 and to inject resin into the receptor 34 determined by the controller 90. The resin injected into the receptor 34 may be maintained within the receptor 34. The resin may be, for example, ultraviolet curing resin.

The controller 90 may be a computing device that is configured to adjust the locations of the optical elements 20 by selectively controlling the operation of camera 70 and micro dispenser 80. As shown in FIG. 5, an example controller 90 may include a memory 92, a processor 94 and an actuator 96.

The memory 92 may be configured to store, for example, programs and data. In particular, the memory 92 may store programs executed by the processor 94 and data used by the processor 94. The image data output from the camera may also be stored in the memory 92. The processor 94 may be configured to execute programs stored in the memory 92, and also may be configured operate on any data stored in memory 92. For example, image data captured by camera 70 may be optionally stored in memory 92, and processor 94 may evaluate the image data to determine that there is a misalignment in the positions of the optical elements. Once a misalignment is identified, the processor can configure the alignment of the optical elements by controlling the micro dispenser 80 via actuator 96.

Figure 6:
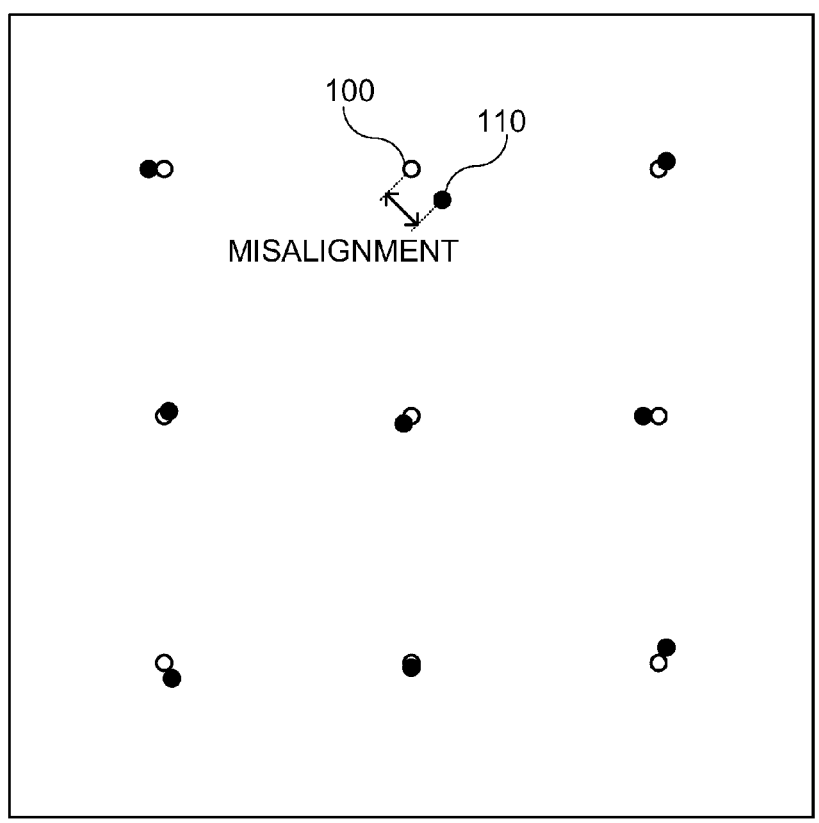
FIG. 6 is a schematic illustration showing an example of misalignments between actual positions of optical elements and desired positions thereof in accordance with the present disclosure.

FIG. 6 is a schematic illustration showing an example of misalignments between actual positions of optical elements and desired positions thereof in accordance with the present disclosure. As shown in FIG. 6, the processor 94 may detect the misalignment between the actual position of the optical element 20 and the desired position of the optical element 20 by comparing the image(s) captured by the camera 70 with a desired image previously stored in the memory 92. Target dots 100 and/or captured dots 110 may be included in the desired image. The target dots 100 may indicate the desired positions of the optical elements 20, while the captured dots 110 may indicate the actual positions of the optical elements 20.

As illustrated, a misalignment between a pair of target and captured dots may indicate that there is a misalignment between a respective pair of optical elements 20 and 50. The processor 94 may be configured to determine the magnitude and direction of each misalignment between each pair of the optical elements 20 and 50 based on each misalignment between each pair of target and captured dots. The processor 94 may also be configured to control the injection of resin into at least one receptor 34 in order to position each optical element 20 at the desired positions based on the detected misalignments, if necessary. Specifically, the processor 94 may be configured to control the micro dispenser 80 through the actuator 96 in order to inject resin into the receptor 34.

Figure 7A:
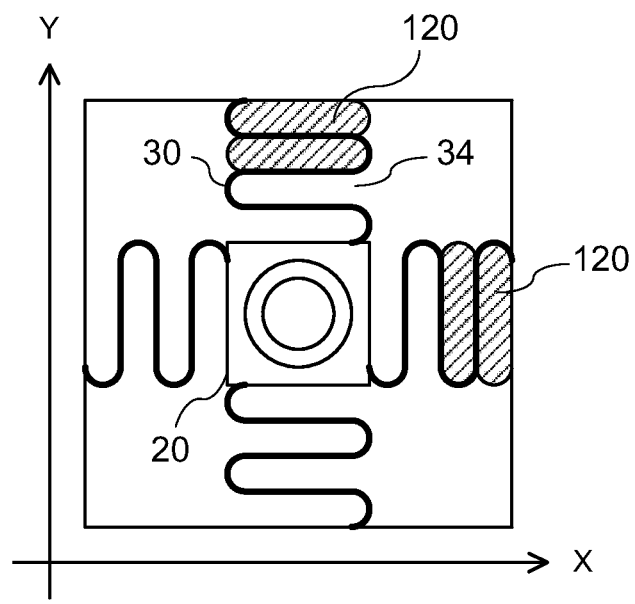
FIG. 7A is a schematic view showing an example of a part of an optical device substrate where resin has been injected into receptors in accordance with the present disclosure.
Figure 7B:
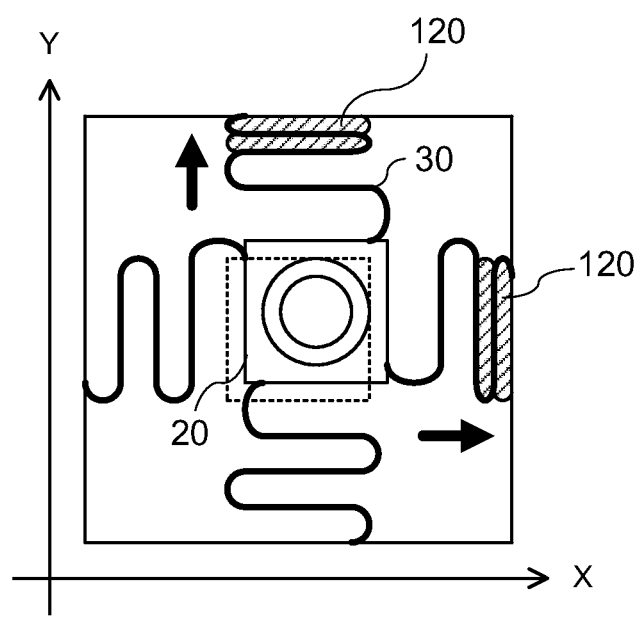
FIG. 7B is a schematic view showing an example of a part of an optical device substrate where resin has been cured in accordance with the present disclosure.

FIGS. 7A and 7B are schematic views showing an example of a part of the optical device substrate 10 where resin has been injected into receptors 34 in accordance with the present disclosure. In FIG. 7A, resin 120 can be injected into four of the receptors 34 of the supporting structures 30 supporting the optical element 20. The resin 120 may be, for example, ultraviolet curing resin which may be cured and shrunk by ultraviolet light as shown in FIG. 7B. The shrinkage in the resin may deform the supporting structures 30 and thereby the position of the optical element 20 may be adjusted by controlling the curing of the resin. In FIG. 7B, while the resin 120 has been shrunk almost by half for illustrative purposes, the actual degree of shrinkage may be smaller by, for example, a few percent. In some examples, the position of the optical element 20 may be moved by a few microns by controlling the shrinkage of the resin 120 injected in one receptor 34. The resin 120 is not limited to ultraviolet curing resin and may be any resin which may cause volume change due to a physical or chemical action after injection. For example, the resin 120 may be visible light curing resin, thermosetting resin or foam resin.

The processor 94 may identify at least one receptor 34 into which the resin 120 is to be injected based on the magnitude and direction of the detected misalignment. As an example for explanation, it can be assumed that the position of the optical element 20 may be moved in one micron by the shrinkage of the resin 120 injected into one receptor 34. If the misalignment between the optical elements 20 and 50 is two microns in X-axis and two microns in Y-axis, as shown in FIG. 7B, the resin 120 may be injected into two receptors 34 of X-axis and two receptors 34 of Y-axis and the resin 120 may be cured and shrunk so as to adjust the optical element 20 at the desired position.

Figure 8:
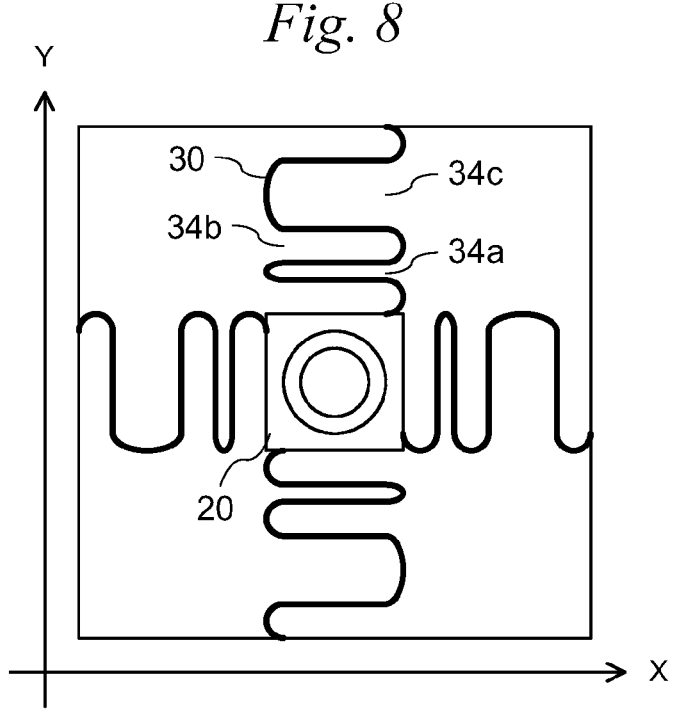
FIG. 8 is a schematic view showing an example of a part of an optical device substrate including supporting structures, each of which has receptors of a different size in accordance with the present disclosure.

In some examples, a shape or dimension of one receptor 34 may be different from that of another receptor 34. FIG. 8 is a schematic view showing an example of a part of an optical device substrate including supporting structures, each of which has receptors of a different size, in accordance with the present disclosure. As shown in FIG. 8, each supporting structure 30 may include receptors 34a, 34b and 34c which each may have different shrinkage volumes.

To illustrate, it can be assumed in some examples that the shrinkage volumes of receptors 34a, 34b and 34c may be one micron, two microns and four microns, respectively, when the resin 120 may be injected into the receptors 34a, 34b and 34c and then shrunk. In this case, the processor 94 may identify which receptor 34 should be selected to be injected with the resin 120. As a specific example, if the misalignment in Y-axis is one micron, the processor 94 may determine to inject the resin 120 into the receptor 34a. Likewise, if the misalignment in Y-axis is seven microns, the processor 94 may determine to inject the resin 120 into the receptors 34a, 34b and 34c. In the same manner, the processor 84 may determine at least one receptor 34 for the misalignments of various sizes. The misalignments in X-axis may also be treated in the same manner.

The number of the supporting structures 30 may be not limited to four. For example, if the optical element 20 is an element whose alignment in one direction does not affect the optical property of the optical device including the optical element 20, it may not be necessary to provide the supporting structure 30 for adjusting the position of the optical element 20 in the direction.

Figure 9:
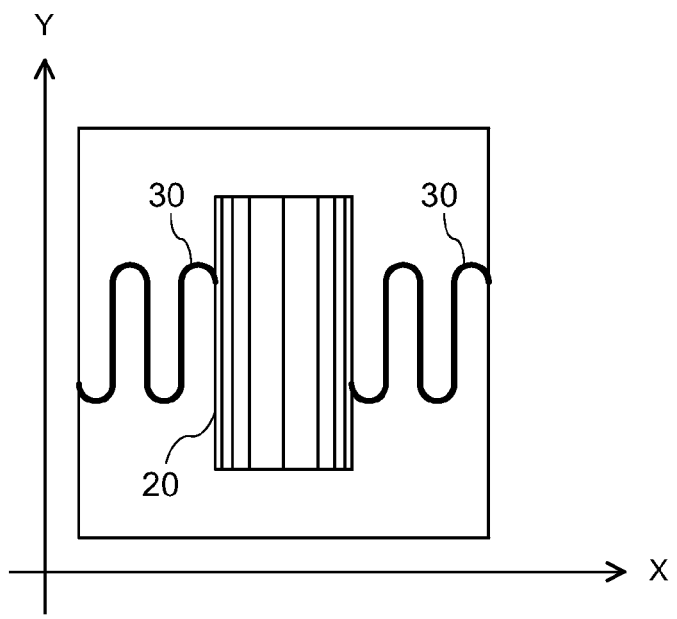
FIG. 9 is a schematic view showing an example of a part of an optical device substrate in accordance with the present disclosure.

FIG. 9 is a schematic view showing an example of a part of an optical device substrate arranged in accordance with the present disclosure. As shown in FIG. 9, if the optical element 20 is a cylindrical lens whose alignment in the direction of Y-axis does not affect the optical property, the optical element 20 may be supported by the supporting structures 30 for adjusting the position of the optical element 20 in the direction of X-axis only.

After the resin 120 (i.e., a first resin) has been injected into at least one of the receptors 34 and cured, another type of resin (i.e., a second resin) may be injected into at least one of the receptors 34 where the resin 120 has not been injected.

Figure 10:
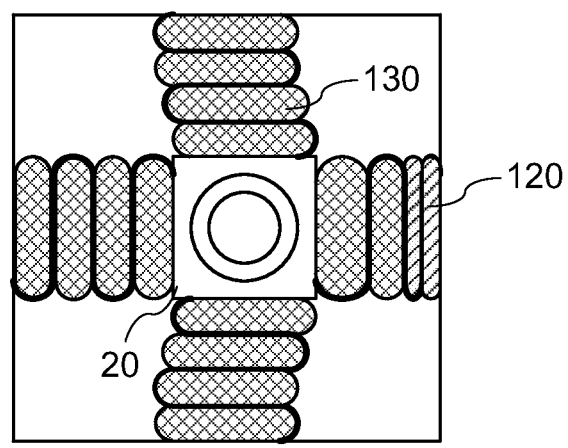
FIG. 10 is a schematic view showing an example of a part of an optical device substrate where resin has been injected into receptors in accordance with the present disclosure.

FIG. 10 is a schematic view showing an example of a part of the optical device substrate 10 where another type of resin has been injected into receptors 34 in accordance with the present disclosure. In FIG. 10, resin 130 (i.e., the second resin) has been injected into the receptors 34 where the resin 120 (i.e., the first resin) has not been injected. The resin 130 may be, for example, ultraviolet curing resin with extremely small shrinkage rate by curing. For example, MUR-XR01 with shrinkage ratio of 0.5 percent sold by Chemiway Maruzen Petrochemical Co., Ltd. may be used as the curing resin 130. The resin 130 may be not limited to ultraviolet curing resins and may be any appropriate resin such as a resin that may cause relatively small volume change after injection. The resin 130 may not be injected into all of the receptors 34 where the resin 120 has been injected.

Figure 11:
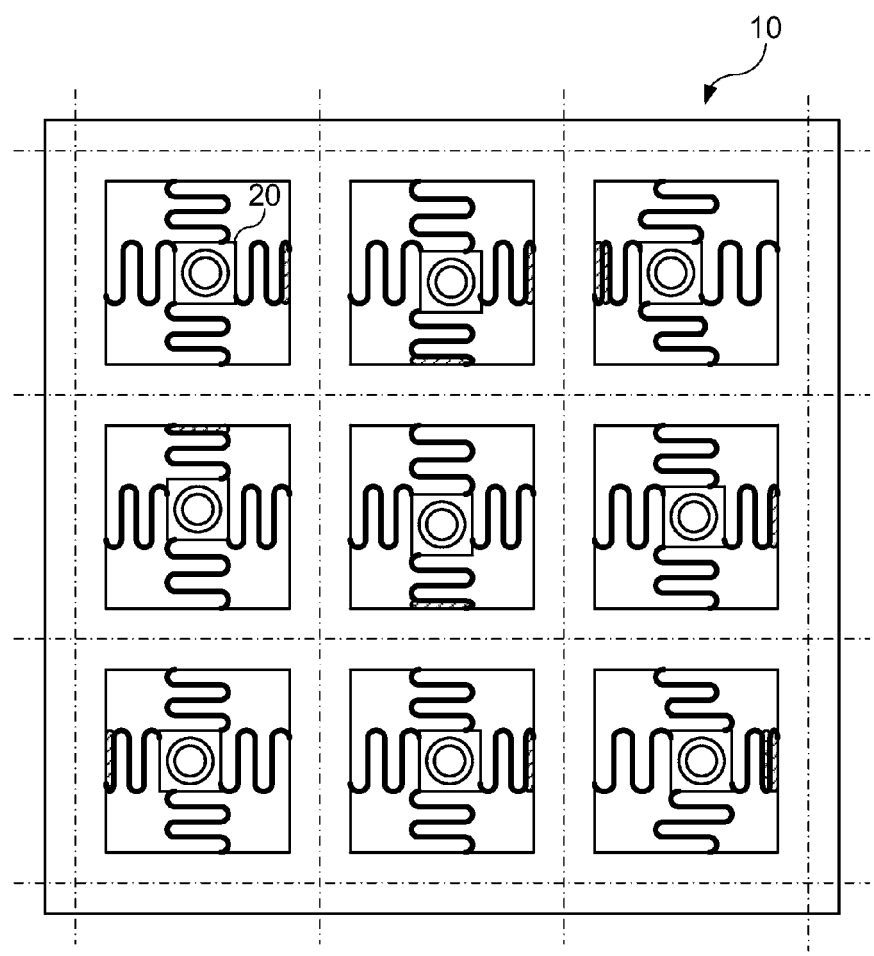
FIG. 11 is a schematic view showing an example of an optical device substrate where resin has been injected into receptors in accordance with the present disclosure.

FIG. 11 is a schematic view showing an example of the optical device substrate 10 where the resin 120 has been injected into receptors 34 in accordance with the present disclosure. As shown in FIG. 11, the position of each of the optical elements 20 (e.g., a 2-D array of elements) may be individually adjusted on the optical device substrate 10. After the position of each of the optical elements 20 has been adjusted, the set of the optical device substrates 10 and 40 may be diced into a plurality of optical devices.

Figure 12A:
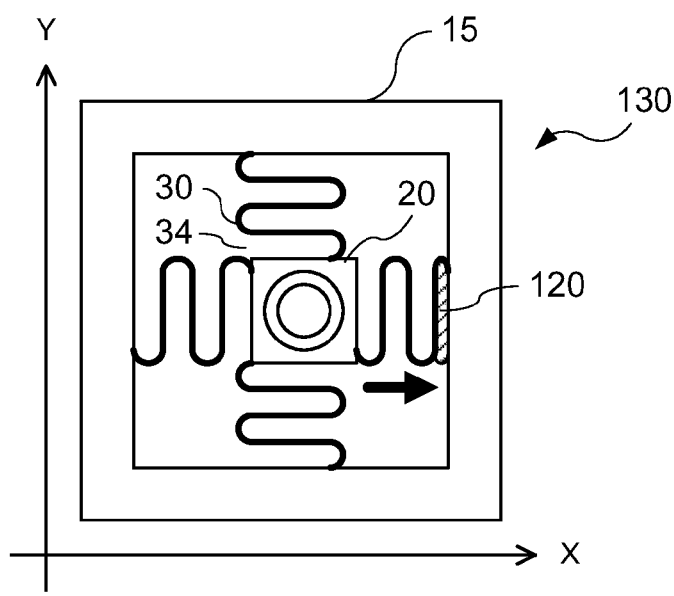
FIG. 12A is a schematic view showing an example of an optical device fabricated in accordance with the present disclosure.
Figure 12B:
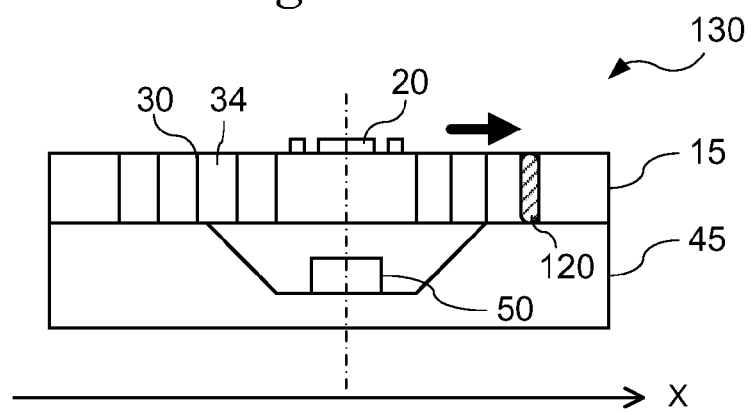
FIG. 12B is a cross-sectional view showing an example of an optical device fabricated in accordance with the present disclosure.

FIGS. 12A and 12B are schematic views showing an example of an optical device fabricated in accordance with the present disclosure. As shown in FIGS. 12A and 12B, the resin 120 has been injected into some of the receptors 34 included in the supporting structures 30 supporting the optical element 20. Furthermore, the position of the optical element 20 has been adjusted by the shrinkage of the resin 120 caused by curing of the resin 120. In the example shown in FIGS. 12A and 12B, the optical element 20 has been moved in the direction of X-axis and thereby the optical axis of the optical element 20 has been aligned with that of the optical element 50.

Figure 13:
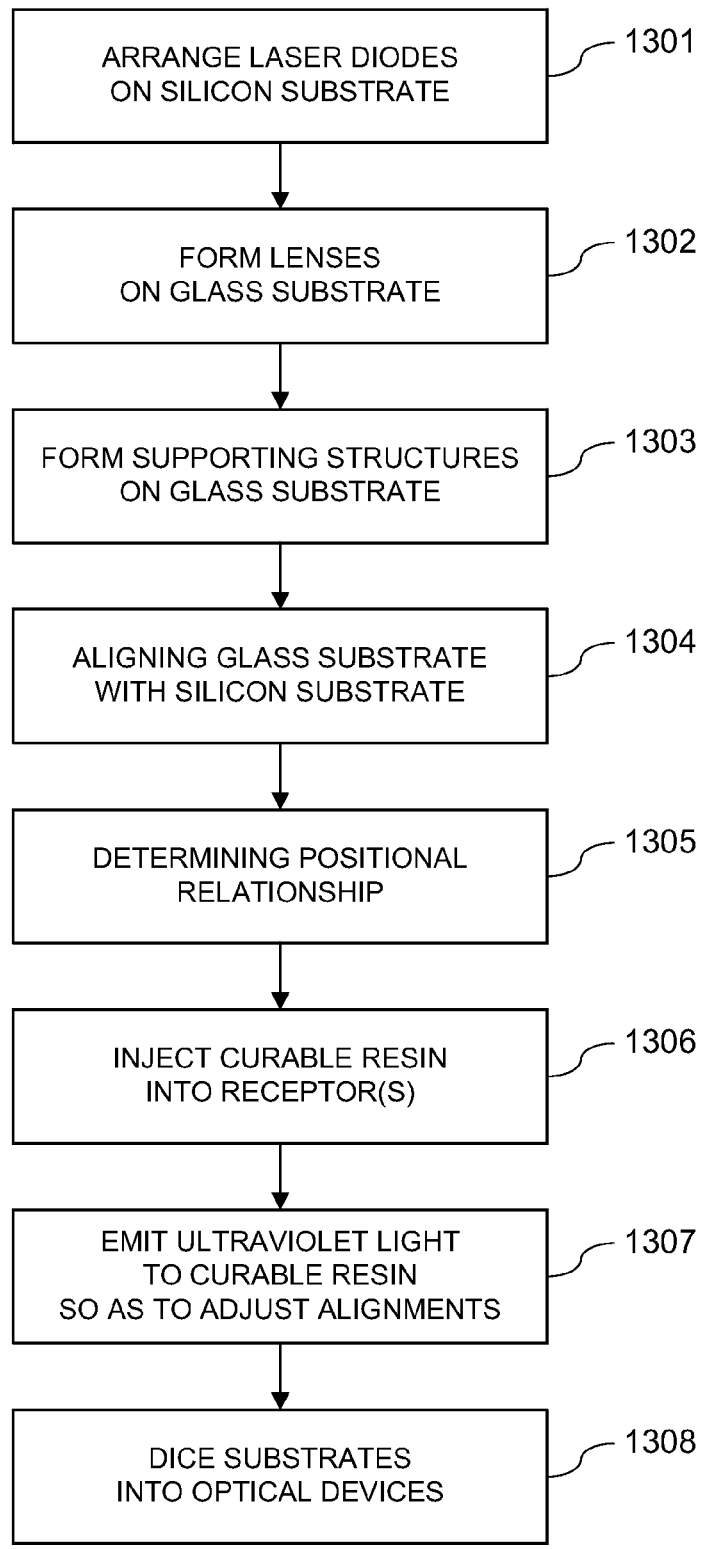
FIG. 13 is a flow chart showing an example of a method for fabricating an optical device in accordance with the present disclosure.

FIG. 13 is a flow chart showing an example of a method for fabricating an optical device in accordance with the present disclosure. The substrates 15 and 45 may be comprised of any materials, including but not limited to silicon, glass or plastic. In some described examples, the substrate 15 may be a glass substrate, the substrate 45 may be a silicon substrate, optical element 20 may be a lens and the optical element 50 may be a LD. Furthermore, in some examples the resin 120 may be an ultraviolet curing resin. The above example materials are merely examples and the substrates 15 and 45, the optical elements 20 and 50, and the resin 120 are not limited to these examples.

An example method may include one or more operations, actions, or functions as illustrated by one or more of blocks 1301-1308. Although illustrated as discrete blocks, the various blocks may be divided into additional blocks, combined into fewer blocks, or eliminated, depending on the desired implementation. Operations may begin at block 1301.

At block 1301, the LDs 50 may be provided on the silicon substrate 45 in a desired arrangement (e.g., a single, 1-D array, 2-D array or some other configuration of LDs). Block 1301 may be followed by block 1302. At block 1302, the lenses 20 may be formed on the glass substrate 15 by, for example, performing dry etching on the surface of the glass substrate 15. Block 1302 may be followed by block 1303. At block 1303, the supporting structures 30 supporting the lenses 20 on the glass substrate 15 may be formed on the glass substrate 15 by, for example, performing dry etching on the glass substrate 15 to penetrate a part of the glass substrate 15. As shown in FIG. 1, the supporting structure 30 may be, for example, a spring structure formed in a meander shape and having receptors 34.

Block 1303 may be followed by block 1304. At block 1304, the glass substrate 15 may be aligned with the silicon substrate 45 such that each lens 20 may be aligned with corresponding LD 50. The glass substrate 15 and the silicon substrate 45 may either be joined or not be joined.

After the glass substrate 15 has been aligned with the silicon substrate 45, block 1304 may be followed by block 1305. At block 1305, the positional relationship of each pair of the lens 20 and the LD 50. The positional relationship may be determined by, for example, the following processes. Laser beams may be emitted from LDs 50 under the control of the driving unit 65. The camera 70 may capture one or more images formed from the laser beams emitted from the LDs 50 through the lenses 20. The processor 94 may determine each misalignment of each pair of the lens 20 and the LD 50 by comparing the one or more image(s) captured by the camera 70 and the desired image stored in the memory 92. Block 1305 may be followed by block 1306.

In block 1306, the ultraviolet curing resin 120 may be injected into at least one receptor 34 based on the determined positional relationship such that the lenses 20 may be adjusted at the desired positions where the resin 120 may be cured and shrunk. The receptor 34 where the ultraviolet curing resin 120 is to be injected may be determined by the processor 94 based on the magnitude and direction of each misalignment between each pair of the lens 20 and the LD 50.

After the injection of the ultraviolet curing resin 120, block 1306 may be followed by block 1307. At block 1307, ultraviolet light may be delivered to the ultraviolet curing resin 120. The ultraviolet curing resin 120 may be cured and shrunk by the ultraviolet light (e.g., for a desired time duration at a desired ultraviolet light level) and thereby the supporting structures 30 may be selectively deformed to adjust the lenses 20 to the desired positions. Block 1307 may be followed by block 1308, where the substrates can be diced into discrete optical devices.

Figure 14:
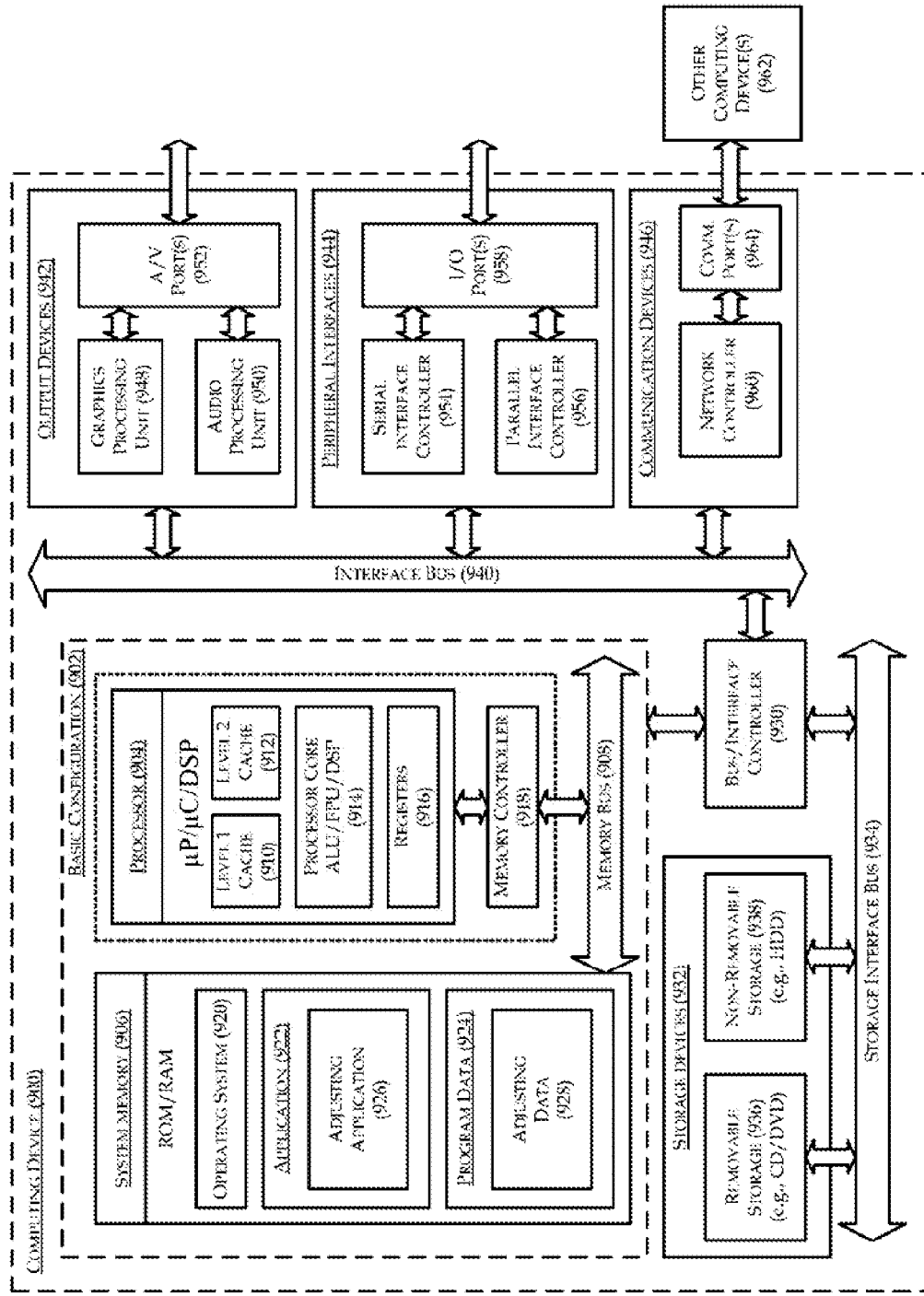
FIG. 14 is a schematic block diagram illustrating an example computing device that is arranged for the controller in accordance with the present disclosure.

FIG. 14 is a schematic block diagram illustrating an example computing device that can be arranged as the controller 90 in accordance with the present disclosure. In a very basic configuration 902, the computing device 900 typically includes one or more processors 904 and a system memory 906. A memory bus 908 may be used for communicating between processor 904 and system memory 906.

Depending on the desired configuration, the processor 904 may be of any type including but not limited to a microprocessor (μP), a microcontroller (μC), a digital signal processor (DSP), or any combination thereof. The processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with the processor 904, or in some implementations the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, one or more applications 922, and program data 924. The application 922 may include a adjusting application 926 that can be arranged to be executed by the processor 904. The program data 924 may include adjusting data 928 that may be useful for adjusting the locations of the optical elements 20 as is described herein. In some embodiments, application 922 may be arranged to operate with the program data 924 on the operating system 920 such that the locations of the optical elements 20 may be selectively adjusted. This described basic configuration 902 is illustrated in FIG. 6 by those components within the inner dashed line.

The computing device 900 may have additional features or functionality, and additional interfaces to facilitate communications between the basic configuration 902 and any required devices and interfaces. For example, a bus/interface controller 930 may be used to facilitate communications between the basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

The computing device 900 may also include an interface bus 940 for facilitating communication from various interface devices (e.g., output devices 942, peripheral interfaces 944, and communication devices 946) to basic configuration 902 via the bus/interface controller 930. Example output devices 942 include a graphics processing unit 948 and an audio processing unit 950, which may be configured to communicate to various external devices such as a display or speakers via one or more NV ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 may include a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

According to the present disclosure, the optical axis of the optical element 20 can easily be aligned with that of the optical element 50 by the controlled shrinkage of the resin 120 injected into the receptor 34. That is, the positions of the optical elements 20 can easily be adjusted in a condition that the optical elements 20 are formed on the substrate 15.

While the technology has been described with respect to a limited number of embodiments, those skilled in the art, having the benefit of this disclosure, will appreciate that other embodiments can be devised which do not depart from the scope of the technology as disclosed herein. Accordingly, the scope of the technology should be limited only by the attached claims.

For example, while the technology has been described with examples for adjusting the alignment of lenses and LDs, the technology of the present disclosure can be adapted for various purposes. Specifically, the technology of the present disclosure can be used for adjusting the alignment of microlenses and light-receiving elements such as CCDs for small camera modules; the alignment of LED chips and lenses for LED lights; and/or the alignment of light-emitting elements and light-receiving elements for concentrated solar power generation system.

Further, as another example, an external light source may be used for detecting the misalignment of first and second optical elements, instead of using light emitted from the first or second optical element. Although not shown in FIG. 5, in one non-limiting example, the adjusting apparatus 60 may include a light source arranged on a pedestal to place the substrate 40. The light source may be configured to emit light through optical lenses to an imaging device such as the camera 70. Alternatively, the light source may be arranged to face a light-receiving element arranged in the substrate 40. The light source may be configured to emit light through an optical lens to the light-receiving element. The controller 90 may be configured to detect the misalignment based on, for example, the feature or position of the light captured by the imaging device or received by the light-receiving element. In some examples, the technology of the present disclosure may be adapted for use in a solution to the problem of alignment in wafer-level mounting.

I claim:
1. An optical device, comprising:
a first substrate having a first optical element;
a second substrate having at least one supporting structure and a second optical element supported by the at least one supporting structure, the at least one supporting structure having at least one receptor, and the at least one supporting structure formed from the second substrate, and the second substrate being coupled to the first substrate; and cured resin arranged in the at least one receptor of the at least one supporting structure effective to position the second optical element relative to the first optical element, wherein the cured resin deforms the at least one supporting structure.

2. The optical device according to claim 1, wherein the cured resin is comprised of a material configured to shrink when cured.

3. The optical device according to claim 1, wherein the cured resin is comprised of an ultraviolet curing resin.

4. The optical device according to claim 1, wherein the at least one receptor includes a plurality of receptors and the cured resin is selectively arranged in at least one of the plurality of receptors.

5. The optical device according to claim 1, wherein the supporting structure is a spring structure and the at least one receptor is at least one space included in the spring structure.

6. The optical device according to claim 1, wherein the at least one supporting structure is configured to move the second optical element in two directions in a plane substantially parallel with respect to the second substrate.

7. The optical device according to claim 1, wherein the at least one receptor includes a plurality of receptors and wherein a shape and/or dimension associated with at least one of the receptors is different from another of the receptors.

8. The optical device according to claim 1, wherein the first substrate and the second substrate are comprised of different materials.

9. The optical device according to claim 8, wherein the second substrate is comprised of glass.

10. The optical device according to claim 8, wherein the second substrate is comprised of transparent resin.

11. The optical device according to claim 1, wherein the second substrate is comprised of transparent material and the second optical element is an optical lens.

12. The optical device according to claim 1, wherein the cured resin is arranged in the at least one receptor effective to adjust an optical axis of the second optical device.

13. An optical device substrate, comprising:
a substrate;
at least one optical element arranged on the substrate; and
at least one supporting structure formed from a portion of the substrate and supporting the at least one optical element, the at least one supporting structure having at least one receptor configured to accept curable resin effective to position the at least one optical element by curing the curable resin, wherein the curable resin deforms the at least one supporting structure after being cured.

14. The optical device substrate according to claim 13, wherein the supporting structure is a spring structure and the at least one receptor is at least one space included in the spring structure.

15. The optical device substrate according to claim 13, wherein the at least one supporting structure is configured to move the at least one optical element in two directions in a plane substantially parallel with respect to the optical device substrate.

16. The optical device substrate according to claim 13, wherein the at least one receptor includes a plurality of receptors, wherein a shape and/or dimension of at least one of the receptors is different from another of the receptors.

17. A method for fabricating an optical device, comprising:
preparing a first substrate having at least one first optical element;
arranging at least one second optical element on a second substrate;
forming at least one supporting structure having at least one receptor from a portion of the first substrate such that the at least one supporting structure supports the at least one second optical element;
aligning the first substrate with the second substrate;
determining a positional relationship between the at least one first optical element and the at least one second optical element;
injecting curable resin into the at least one receptor based on the determined positional relationship; and
deforming the at least one supporting structure by curing the curable resin effective to align the at least one first optical element with the at least one second optical element.

18. The method according to claim 17, wherein curing the curable resin comprises directing light rays to the curable resin effective to cure the curable resin.

19. The method according to claim 17, further comprising:
identifying a desired positional relationship between the at least one first optical element and the at least one second optical element;
comparing the determined positional relationship to the desired positional relationship to identify a difference; and
determining a volume of the curable resin to inject into the at least one receptor based on the difference.

20. The method according to claim 17, further comprising:
identifying a desired positional relationship between the at least one first optical element and the at least one second optical element;
comparing the determined positional relationship and the desired positional relationship to identify a difference; and
selecting at least one location of the at least one receptor to inject the curable resin based on the difference.

21. The method according to claim 17, further comprising stabilizing the supporting structures after the curable resin has been cured.

22. The method according to claim 17, wherein determining the positional relationship comprises detecting light emitted from the at least one first optical element through the at least one second optical element.

23. The method according to claim 17, wherein shrinkage of the curable resin during curing deforms the at least one supporting structure to align the at least one first optical element with the at least one second optical element.

* * * * *